(No Model.)

W. T. MARTIN.
COOKING APPARATUS.

No. 495,821. Patented Apr. 18, 1893.

Witnesses:
Geo. W. Rea
Robert Everett

Inventor:
William T. Martin,
By James L. Norris.
Atty

UNITED STATES PATENT OFFICE.

WILLIAM TRUSWELL MARTIN, OF NOTTINGHAM, ENGLAND.

COOKING APPARATUS.

SPECIFICATION forming part of Letters Patent No. 495,821, dated April 18, 1893.

Application filed November 25, 1892. Serial No. 453,053. (No model.) Patented in England February 5, 1892, No. 2,266.

*To all whom it may concern:*

Be it known that I, WILLIAM TRUSWELL MARTIN, machinist, a subject of the Queen of Great Britain, residing at Russell Street, in the town of Nottingham, England, have invented certain new and useful Improvements in Cooking Apparatus, (for which I have obtained a patent in Great Britain, dated February 5, 1892, No. 2,266,) of which the following is a specification.

The object of my invention is to effect improvements in ordinary dripping tins or roasting pans, for the purpose of facilitating the turning of the meat or other viands while in an oven or before a fire.

To accomplish this object my invention involves the features of construction and the combination or arrangement of parts hereinafter described and claimed, reference being made to the accompanying drawings, in which—

Figure 2:
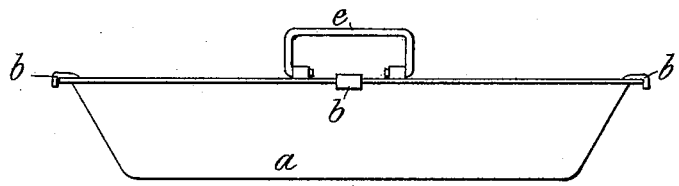
Figure 1:
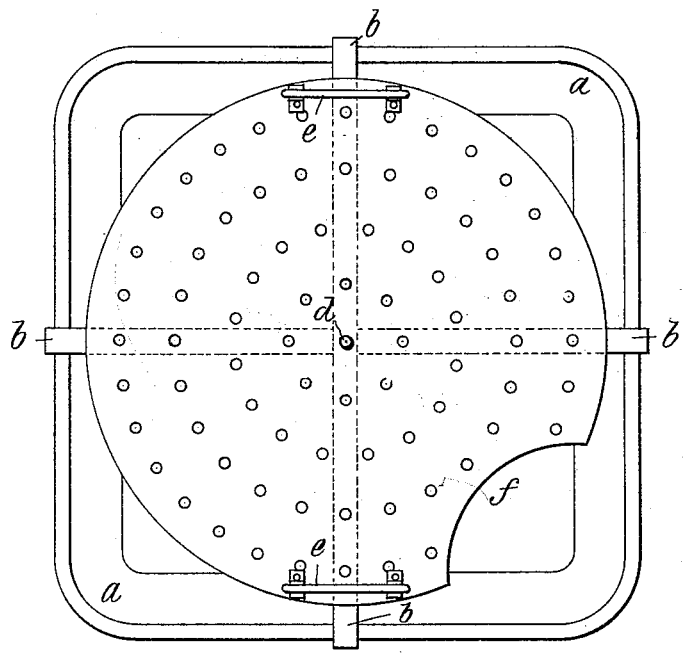
Figure 3:
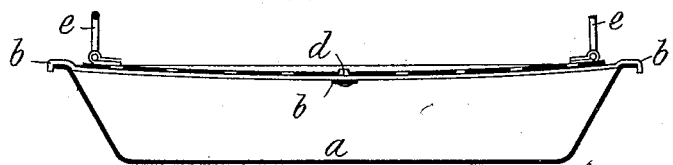

Figure 1 is a plan; Fig. 2 a side view, and Fig. 3 a section.

$a$ is an ordinary dripping tin.

$b$ is a loose frame, slightly dished, and having four or any other number of radial arms to rest upon the tin.

$c$ is a circular perforated plate or grid also slightly dished, which is retained in position by a pivot $d$.

$e\ e$ are two handles, by which the plate may be turned round while in the oven, or they may be used for lifting the plate.

A portion of the plate or grid $c$ is cut away at $f$, to allow the insertion of a spoon for basting purposes.

By the use of my invention whatever is being cooked upon the perforated plate or grid can be turned round and adjusted to the hottest side of the oven, without taking the tin out of the oven. Thus I avoid the trouble of lifting the tin out to turn it round, and consequent risk of accidents which frequently occur through the tin being hot.

I claim—

1. In a cooking apparatus as aforesaid, the combination with an ordinary dripping pan, of a revolving perforated plate or grid pivoted to a supporting frame, said frame resting on the rim or flange of the pan, substantially as described.

2. In a cooking apparatus, the combination with the pan $a$, provided with a revolving tray $c$, pivoted to a removable frame $b$, said frame resting on the rim or flange of the pan, substantially as described.

3. In a bake or other pan, the combination therewith, of a removable supporting frame having pivoted thereto a revolving grid or tray a portion of which is cut away or removed, as and for the purpose described.

Dated this 18th day of October, 1892.

WILLIAM TRUSWELL MARTIN.

Witnesses:
 W. H. WARSOP,
 W. LOCKETT,
*Clerks to Mr. W. H. Speed, Notary Public, Nottingham.*